United States Patent [19]

Allweier et al.

[11] Patent Number: 4,586,357
[45] Date of Patent: May 6, 1986

[54] DIGITAL CONTROL SPRING FORMING MACHINE

[75] Inventors: Werner K. Allweier, Huntington; David W. Knight, Stratford, both of Conn.

[73] Assignee: The U. S. Baird Corporation, Stratford, Conn.

[21] Appl. No.: 701,611

[22] Filed: Feb. 14, 1985

[51] Int. Cl.⁴ .............................................. B21F 35/02
[52] U.S. Cl. .......................................... 72/137; 72/7; 140/103
[58] Field of Search ............... 140/103, 71 R; 72/130, 72/131, 132, 135, 137, 7

[56] References Cited

U.S. PATENT DOCUMENTS

| | | | |
|---|---|---|---|
| 3,025,889 | 3/1962 | Clay | 140/71 R |
| 3,025,890 | 3/1962 | Clay | 140/71 R |
| 3,025,891 | 3/1962 | Clay | 140/71 R |
| 3,026,012 | 3/1962 | Clay | 226/187 |
| 3,038,505 | 6/1962 | Clay | 140/71 R |
| 3,314,453 | 4/1967 | Holmes | 140/103 |
| 3,338,112 | 8/1967 | Holmes | 74/568 R |
| 3,376,722 | 4/1968 | Holmes | 72/43 |
| 3,459,066 | 8/1969 | Holmes | 74/568 R |
| 4,026,135 | 5/1977 | Yagusic et al. | 72/14 |
| 4,289,004 | 9/1981 | Itaya | 140/103 |
| 4,476,702 | 10/1984 | Zangerle | 140/103 |

OTHER PUBLICATIONS

Catalog 71, "Complete Springs in a Single Operation by Controlled Wire Deflection", U.S. Baird Corporation, Stratford, Connecticut.

Primary Examiner—Francis S. Husar
Assistant Examiner—Jorji M. Griffin
Attorney, Agent, or Firm—Cifelli, Frederick & Tully

[57] ABSTRACT

A wire forming apparatus for making springs with coiled body portions and end loops is modified by providing a digital controlled wire feeding accessory. The accessory permits the normal mechanical feeding of the wire and tooling to be interrupted for desired intervals during the spring forming process thereby allowing digital controlled wire feeding to occur. The digital controlled wire feeding enhances the normal operation of the apparatus by allowing specified lengths of wire to be added to the coiled body portions and/or end loops of the manufactured spring.

32 Claims, 16 Drawing Figures

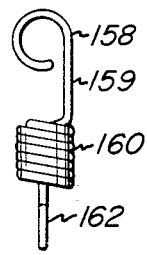
FIG. 5A
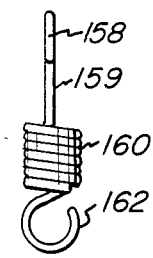
FIG. 5B
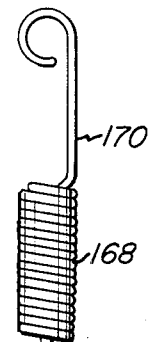
FIG. 8A  FIG. 8B
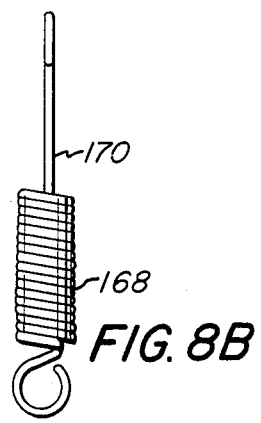
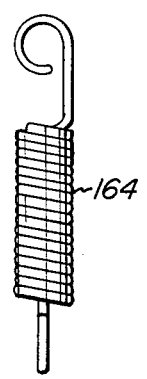
FIG. 6A
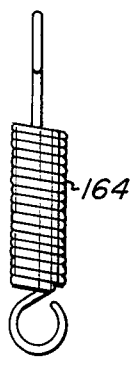
FIG. 6B
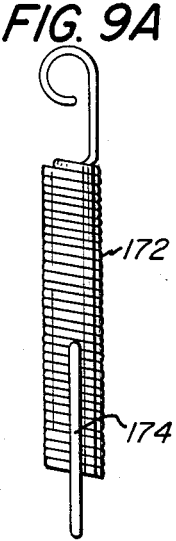
FIG. 9A  FIG. 9B
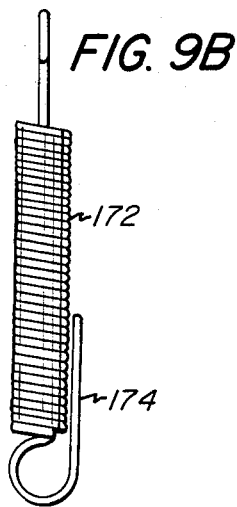
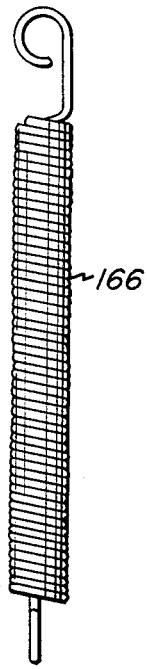
FIG. 7A
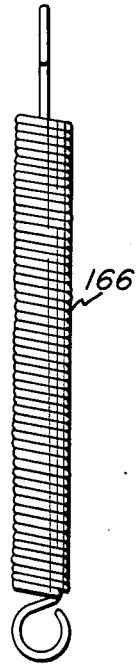
FIG. 7B
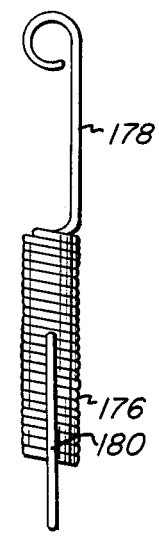
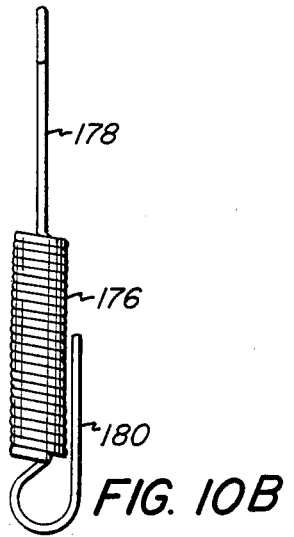
FIG. 10A  FIG. 10B

DIGITAL CONTROL SPRING FORMING MACHINE

BACKGROUND OF THE INVENTION

The present invention relates to spring forming apparatus for producing coil springs having concurrently formed end loops and, more particularly, to spring forming apparatus equipped with an auxiliary digital feed assembly for supplementing the mechanical feed assembly.

A spring forming machine similar to that described in U.S. Pat. No. 3,025,889 is currently available from and being produced by The U.S. Baird Corporation, Stratford, Conn., under the trademark SprinGenerator ® as their Model No. 1. The basic advantages of this machine is that a complete spring, including the two end loops and the central coil body portion, can be manufactured in a single cycle or operation. The machine utilizes a mechanical feeding operation to feed wire and control the wire forming tooling. The operation incorporates cam followers cooperating with adjustable cams to control the plurality of wire forming tools to produce the coiled springs with end loops. The tools are movable into and out of operative position in front of an orifice provided in a wire guide through which the wire is fed. In their operative positions, the tools are positioned to deflect the wire in different directions to form the desired spring configuration. The completed spring is severed from the wire stock by a cutoff tool and the operation is performed on the succeeding length of wire. The mechanical drive mechanism to produce these movements is similar to the mechanisms described in U.S. Pat. Nos. 3,025,890 and 3,025,891.

The prior art machine adequately produces the same spring at a very rapid rate (720–6400 pieces per hour) and once properly set up can be run continuously making such springs. The machine is excellent for large production runs of the same spring; however, to change the number of coils or to add lengths of the wire to the end loops requires repositioning of all the cams and changing the feeding setup for the wire length by changing the feed-gearing ratio. This is a somewhat time-consuming process which must be undertaken with a considerable amount of skill and dexterity.

It would be highly desirable to overcome this setup limitation of the prior art machine by permitting the interruption of the mechanical feed for the tooling and wire feed described above and using an auxiliary feeding drive to feed additional wire at appropriate points during the production of the individual springs. This would enable the operator to produce a family of springs having variations in the number of coils and the length of the loop extensions.

It is an object of the present invention to provide a novel spring forming machine which allows a selected amount of wire to be added to a spring in several places during the spring forming process once the machine is initially set up to produce a basic spring.

It is also an object to provide such a machine which reduces changeover time to produce a family of springs having a wide variety of coil body and end loop portions.

Still another object is to provide a machine which runs as a conventional spring forming machine or as a digitally controlled machine, thereby significantly increasing the versatility of the machine.

A further object is to provide such a digital feeding accessory which can be installed as original equipment or readily applied to existing spring forming machines.

An additional object is to provide an accessory which may be fabricated readily and relatively economically and which will enjoy a long life in operation.

SUMMARY OF THE INVENTION

It has now been found that the foregoing and related objects can be readily attained by modifying the basic machine manufactured and sold by The U.S. Baird Corporation, to include a novel accessory for feeding a select amount of wire in one or more places during the spring forming process once the machine is set up to produce a basic spring. The basic machine includes a fixed wire guide having a rear end and a forward end and a bore therethrough terminating at the forward end in a feeding orifice, and a pair of feed rollers for advancing wire through the bore from the rear to the forward end. Adjacent the forward end of the wire guide are a multiplicity of wire deflecting tools mounted for operation between retracted positions and operative positions. The machine is provided with a mechanical feed actuating mechanism for driving the feed rollers and a wire forming tool actuating mechanism for sequentially operating the multiplicity of wire deflecting tools.

The accessory of the present invention includes an electronic controller for deactivating both of the actuating mechanisms thereby locking the wire forming tooling in a desired position and activating the auxiliary drive unit for a prescribed time interval thereby driving the feed rollers to advance an additional length of wire through the wire guide. The electronic controller is programmable to deactivate the actuating mechanisms and activate the auxiliary drive unit at several points during the sequential operation of the multiplicity of wire deflecting tools. The deactivation of the actuating mechanisms is achieved through an air operated clutch brake system including a pair of electrically operated valves for introducing air to the clutch and brake system.

Conveniently, a proximity sensing device, including sensor actuators and proximity switches, is operatively connected between the controller and the wire forming tool actuating mechanism. The sensor actuators are mounted for movement with the wire forming tool actuating mechanism while the proximity switches are disposed adjacent the path of movement of the sensor actuators to detect movement thereof. The sensor actuators and proximity switches are operationally disposed in such a manner to signal the controller at different points during the spring forming operation. Accordingly, the controller utilizes these signals to control the actuating mechanisms and auxiliary drive unit to feed the additional wire at appropriate points during the spring forming process.

Ideally, the auxiliary drive unit includes a servo motor with tachometer and encoder feedback and a reduction gearbox permitting the auxiliary drive unit to be operated at high speeds. Both the auxiliary drive unit and the mechanical feed actuating mechanism are operatively connected to the feed rollers wherein either the auxiliary drive unit or the mechanical feed actuating mechanism can drive the feed rollers.

Our invention will be fully understood when reference is made to the following detailed description taken in conjunction with the accompanying drawings.

BRIEF DESCRIPTION OF THE DRAWINGS

FIG. 5A and 5B through 10A and 10B are enlarged side elevational views of springs produced by the machine of this invention.

DETAILED DESCRIPTION OF THE PREFERRED EMBODIMENT

Figure 1:
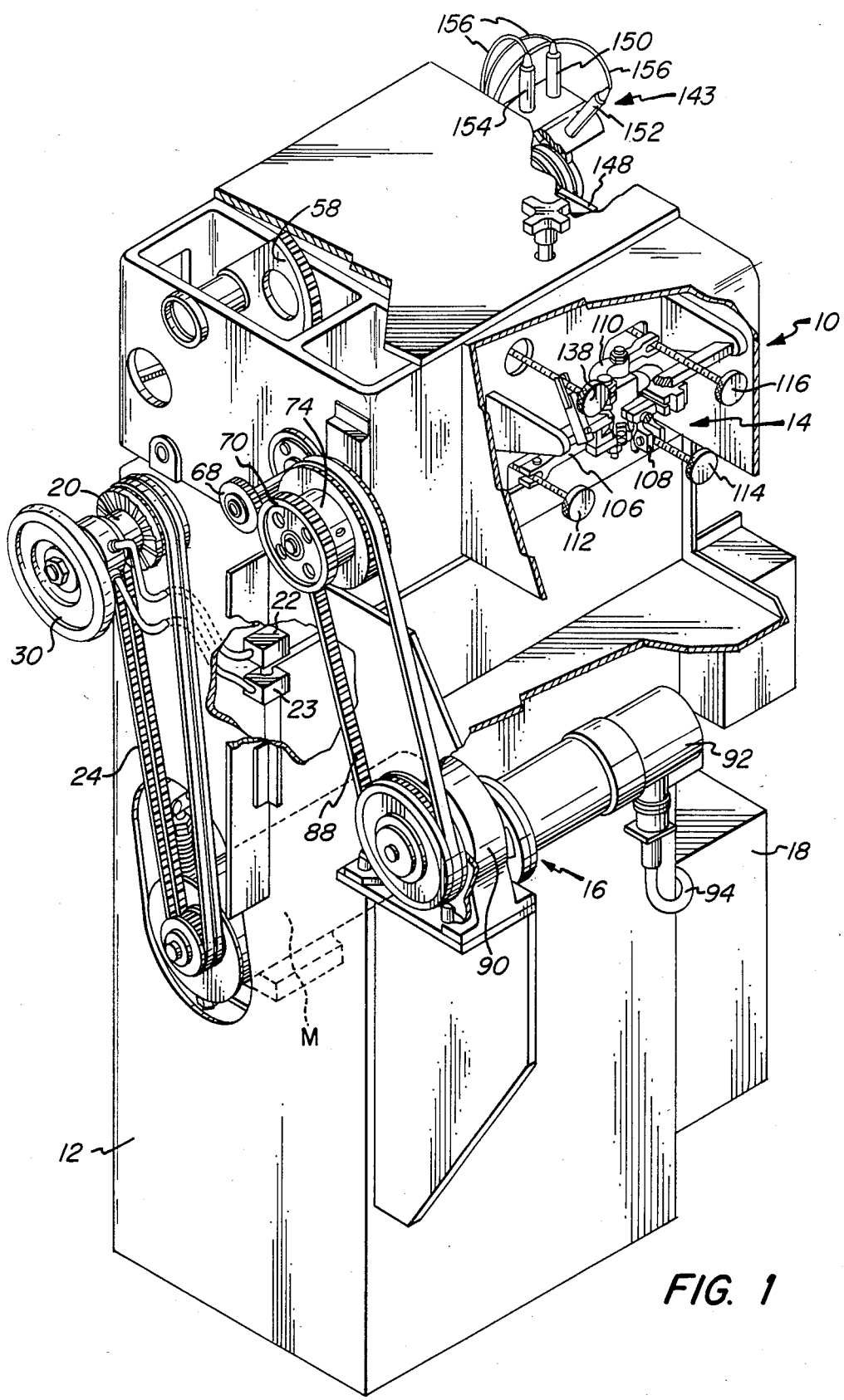
FIG. 1 is a perspective view of a spring forming machine embodying the present invention with portions of the frame removed and broken away to show internal structure.

Turning first to FIG. 1 of the drawings, therein illustrated is a basic spring forming machine generally indicated by the numeral 10 as modified to employ the present invention. The basic spring forming machine is presently available on the market from and manufactured by U.S. Baird Corporation, Stratford, Conn. as their Model No. 1 under the trademark Sprin-Generator ®. This machine has certain basic similarities to the machines disclosed in U.S. Pat. Nos. 3,025,889, 3,025,890 and 3,025,891 which are hereby incorporated by reference.

As shown in FIG. 1, the machine 10 has a frame 12 having wire forming tooling generally indicated by numeral 14, mounted on the front panel thereof. A main drive motor M is mounted within the frame 12 and is operatively connected to the wire forming tooling 14 by means and for purposes to be explained further hereinafter. Mounted on the frame below the wire forming tooling 14 is an auxiliary wire feeding drive generally indicated by the numeral 16. The auxiliary wire feeding drive 16 is controlled by a numerical controller 18, which may be a microprocessor or the like, and which also controls an air operated clutch brake system 20 by means of a pair of electrically operated valves 22, 23. The numerical controller 18 can be a commercially available programmable controller available from Contraves, Motion Control Division, Pittsburgh, Penna. as Model No. 1-80A-1-P-40-414 single axis motion 80A with NC-414 servo drive.

Figure 2:
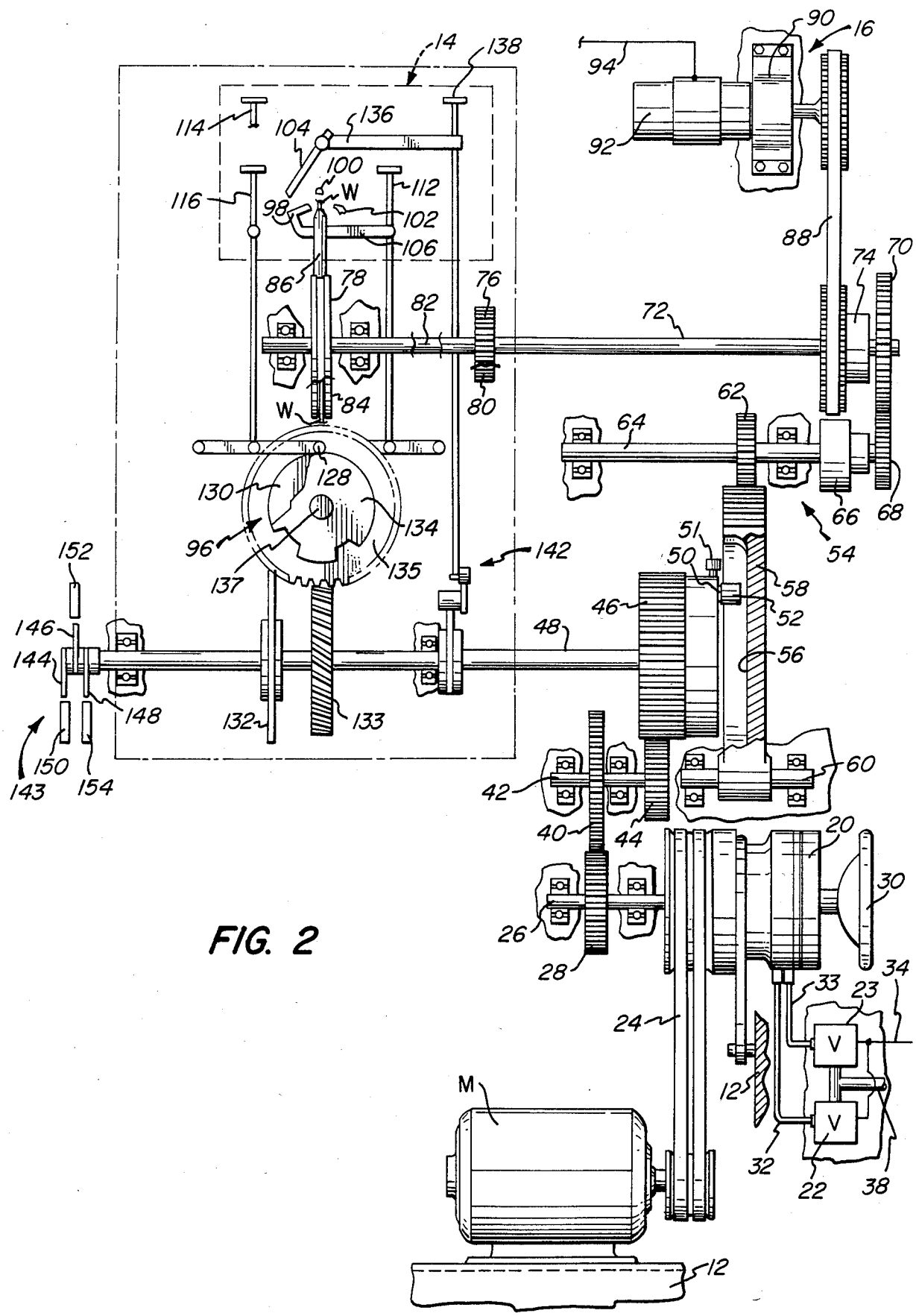
FIG. 2 is a schematic illustration of the spring forming apparatus of the present invention showing the means employed to control movement of the associated spring forming tools and feed the wire.

Referring now in detail to FIG. 2, the main drive motor M is operatively connected to the air operated clutch brake system 20 by a conventional double belt and pulley arrangement 24. On one side of the system 20 is a clutch shaft 26 having a drive gear 28 disposed thereon; while the other side of the system 20 has a handwheel 30 extending therefrom for use by the operator to manually rotate shaft 26 as will be explained further hereinafter.

The clutch brake system 20 is a conventional system available from Horton Manufacturing Co., Inc., Minneapolis, Minn. as Model No. LWCB8289 and is controlled through air lines 32, 33 from valves 22, 23 which in turn communicate with the controller 18 through line 34. The valves 22, 23 are also connected to a compressed air source 36 (FIG. 4) through airline 38. Valve 22 operates the clutch portion of the system 20 and is a normally closed valve while valve 23 operates the brake portion and is a normally open valve. Accordingly, the air source 36 will be in communication with the brake when the machine is deactivated thereby locking the machine against manual actuation by handwheel 30.

The gear 28 meshes with an intermediate gear 40 having an idler shaft 42 with gear 44 on one end thereof. Gear 44 meshes with relatively large gear 46 mounted on a horizontal cam shaft 48. Mounted on the outer side of gear 46 is a crank pin 50 radially adjustable thereon by means of adjuster 51 and having an antifriction roller 52 which is operatively connected to a mechanical feed roller actuating mechanism generally indicated by the numeral 54.

The operation and components of the mechanical feed roller actuating mechanism 54 are described and illustrated in referenced patents; particular attention should be given to U.S. Pat. No. 3,025,891. The antifriction roller 52 of the crank pin 50 is captured in a longitudinal guideway 56 located in arcuate gear segment 58. The gear segment 58 is mounted on a rocker shaft 60 and meshes at its distal end with transfer gear 62 disposed on clutch shaft 64. The gear 62 is operatively connected through an overrunning clutch 66 to a drive feed gear 68 mounted outboard thereof. The drive feed gear 68 meshes with a driven feed gear 70 mounted on an upper feed roller shaft 72 which also carries a second overrunning clutch 74. The upper feed roller shaft 72 carries an upper feed gear 76 and an upper feed roller 78 thereon. The upper feed gear 76 meshes with an identical lower feed gear 80 provided on a lower feed roller shaft 82; the shaft 82 carries a lower feed roller 84. Opposed pressure exerted by the upper and lower feed rollers 78, 84 grips the wire W disposed therebetween. The wire W is threaded through a central orifice in wire guide 86.

The range of wire feed by the mechanical feed roller actuating mechanism 54 can be altered considerably by changing the ratio of the drive and driven feed gears 68, 70. Minor adjustments to the wire feed can be made by radial adjustment of the crank pin 50 on the gear 46. Accordingly, the machine 10 can be set up to feed a variety of predetermined lengths of wire as might be necessary in the production of different sized springs.

Operatively associated with the overrunning clutch 74 is the auxiliary wire feeding drive 16 provided with a conventional belt and pulley arrangement 88, a gear reduction mechanism 90, and a servo motor 92. The motor 92 is commercially available from Contraves Motor Control Division, Pittsburg, Penna., as Model No. C402-00H-03-01-F1-CSO/EQ2500 and includes tachometer and encoder feedback to the controller 18 through the electrical line 94. The gear reduction mechanism 90 permits the servo motor 92 to be run efficiently at high speed while providing a lower driving speed to the feed rollers 78 and 84 through the pulley and belt arrangement 88 and the clutch 74. The overrunning clutches 66 and 74 permit either the auxiliary wire feeding drive 16 or the mechanical feed roller actuating mechanism 54 to rotate shaft 72 and the feed rollers 78 and 84. The clutch 66 allows the intermittent feeding of the wire W through the actuating mechanism 54 but slips when the feeding drive 16 drives the shaft 72 and the gears 68 and 70 through the clutch 74.

The wire forming tool actuating mechanism is generally indicated by numeral 96 and controls three wire forming tools 98, 100 and 102 and a cutoff tool 104. The tool actuating mechanism 96 will be presently discussed in an abbreviated fashion since it is completely disclosed in the reference patents.

Each of the tools 98, 100, 102 and 104 are individually movable between a retracted position and an advanced or operative position adjacent the orifice of the wire guide 86. Tool 98 is a first looping tool and is advanced to initially engage the end of the wire W emanating from wire guide 86 to form an end loop. Thereafter, the tool 98 retracts as tool 100, known as the body coiling tool, advances to form the body coil of the spring. When the body coil is completed, tool 100 retracts and the second looping tool 102 moves into position to complete the second end loop. As this task is completed, the tool 102 retracts and the cutoff tool 104 moves upward to sever the spring at the end of the orifice of the wire guide 86.

Figure 3:
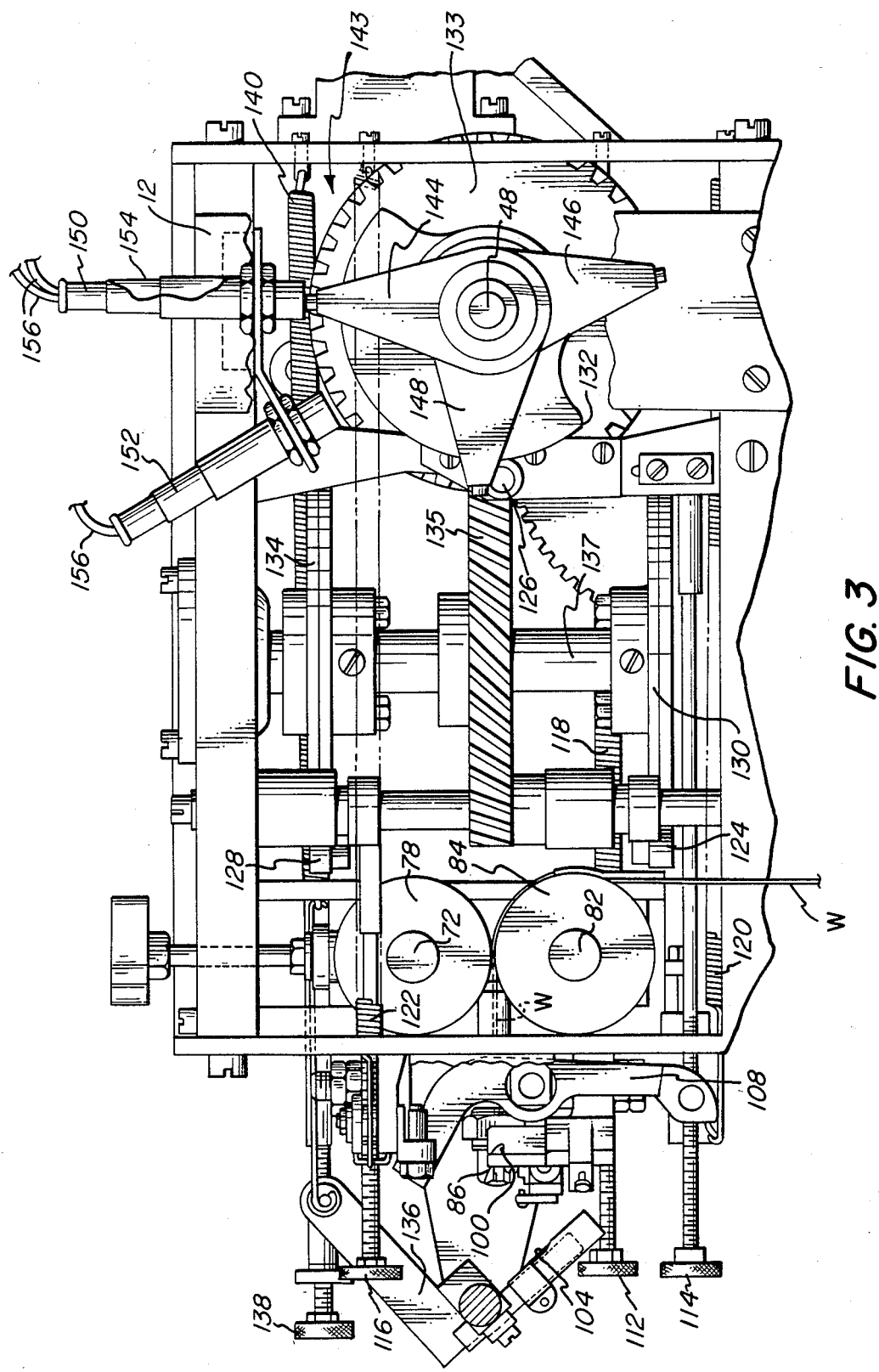
FIG. 3 is a fragmentary side elevational view of the spring forming machine with portions of the frame removed and broken away for clarity of illustration.

As described in the referenced patents, the tools 98, 100 and 102 are carried by rocker arms 106, 108 and 110 (FIGS. 1 and 2), respectively, which are controlled by pull rods 112, 114 and 116 in combination with springs 118, 120 and 122. As best seen in FIGS. 2 and 3, the pull rods 112, 114 and 116 are operated by cam followers 124, 126 and 128, respectively, riding on cams 130, 132 and 134. The body coiling cam 132 and a gear 133 are carried on the horizontal cam shaft 48 while first and second end loop cams 130 and 134, as well as gear 135, are disposed on a vertical cam shaft 137. Gear 133 transfers motion from shaft 48 to shaft 137 through meshing contact with gear 135. Springs 118, 120 and 122 bias the pull rods 112, 114 and 116 rearwardly tending to swing the tools 98, 100 and 102 into their operative positions. As explained in detail in the referenced patents, each spring will move its associated tool into its operative position when the associated cam follower reaches a depression in its associated cam. The tool will be retracted when the follower rises out of the depression.

As illustrated in FIG. 3, the cutoff tool 104 is disposed below the wire guide 86 on a support bar 136. The cutoff tool 104 swings upwardly at the end of the spring forming process as controlled by its push rod 138, spring 140 and cam mechanism generally indicated by numeral 142 (see FIG. 2) to sever the completed spring from the wire W. The cam mechanism 142 is operatively connected to the horizontal cam shaft 48.

As seen in FIGS. 1–3, located adjacent the end of the horizontal cam shaft 48 is a proximity sensing device generally indicated by numeral 143 and including three proximity switch actuators 144, 146 and 148 rotatable with the cam shaft 48. Each of the actuators is operatively connected to one of three proximity switches 150, 152 and 154, respectively. These proximity switches are tubular type inductive proximity sensors distributed by Cutler Hammer Products, Milwaukee, Wisc., as Catalog No. E57MAL1842. The switches 150, 152 and 154 are mounted on the frame 12 of the machine 10 adjacent the arcuate path of movement of its associated actuator and communicate with the controller 18 through lines 156. As best seen in FIG. 3, the actuators are angularly offset from one another and are positioned to swing by their associated switches to actuate the same for purposes to be explained further hereinafter.

During formation of a spring, the horizontal cam shaft 48 makes one revolution or cycle about its longitudinal axis and carries the actuators 144, 146 and 148 past their associated proximity switches 150, 152 and 154. Each of the actuators is adjusted angularly on the shaft 48 so that its position as it passes its associated proximity switch corresponds to a particular position of the tooling producing a particular portion of the spring. Referring to FIG. 3, the actuator 144 is shown in a position to actuate its switch 150 and signal the numerical controller 18 for reasons to be explained hereinafter. In this position, the first looping tool 98 of the tooling 14 has been withdrawn and the body coiling tool 100 has not yet reached its operative position. Subsequently, as shaft 48 continues to rotate counterclockwise as viewed in FIG. 3, the actuator 146 is positioned to achieve active alignment with its switch 152 when the body coiling tool 100 is in its operative position. Continued rotation of shaft 48 will bring actuator 148 and switch 154 into active alignment as the second looping tool 102 withdraws from its operative position just prior to actuation of the cutoff tool 104.

Figure 4:
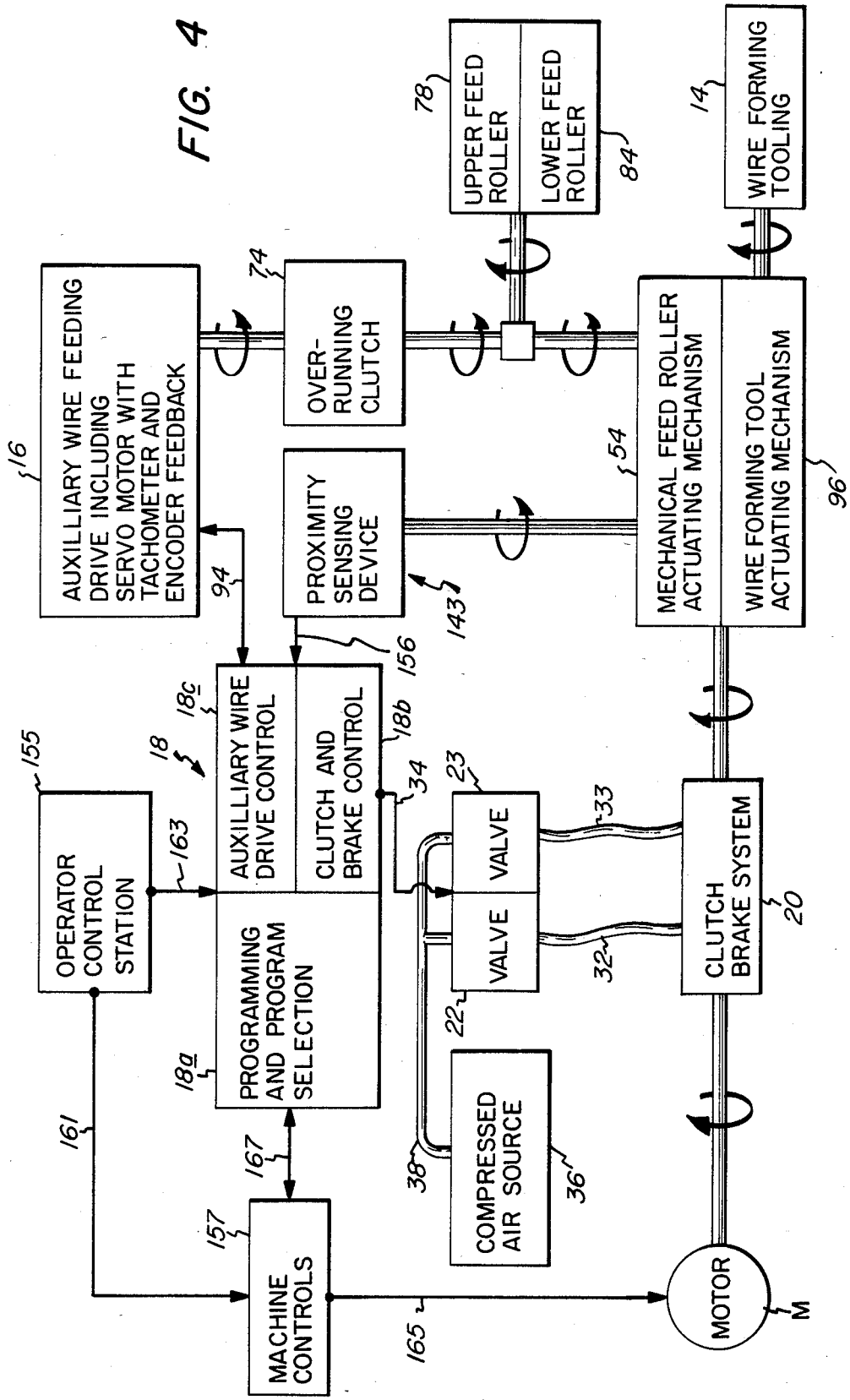
FIG. 4 is a block schematic diagram depicting the mechanical and electrical interrelationships of the various components of the present invention.

FIG. 4 illustrates by a block diagram layout, a simplified view of the interrelationships between the electronic controls and the mechanical components of the machine 10 of this invention. The controls include the central numerical controller 18, an operator control station 155 and basic machine controls 157. For purposes of illustration only, the central controller 18, can be pictured as having three sections: Programmer and programming selector section 18a; clutch and brake control 18b; and auxiliary wire drive control 18c.

The programming and program selector section 18a is utilized by the operator to input the specific commands into the controller's memory to produce a desired spring and facilitate the recalling of these programmed commands from the memory. The clutch and brake control 18b and the auxiliary drive control 18c receive signals from the proximity sensing device 143 through line 156. Through line 34, the clutch and brake control 18b operates the valves 22 and 23 which in turn control the mechanical feed roller actuating mechanism 54 and the wire forming tool actuating mechanism 96 through the clutch and brake system 20. The auxiliary wire drive control 18c controls the auxiliary wire feeding drive 16 through line 94.

The control station 155 permits selection of the mode of machine operation and communicates with the machine controls 157 and the controller 18 through lines 161 and 163, respectively. The machine controls 157 controls the operation of the main drive motor M via line 165 and communicates with the controller 18 through line 167.

The operation of the present invention will now be explained in greater detail. The operator initially sets up the machine by adjusting the mechanical feed roller actuating mechanism 54 and the wire forming tool actuating mechanism 96 to produce a basic spring. A typical basic spring is shown in FIGS. 5A and 5B as having a standard first end loop 158, a first loop extension 159, a seven coil body portion 160, and a standard second end loop 162. The setup for such a spring is known to and can be readily practiced by those skilled in the art. It requires appropriate adjustment or replacement of the cams (130, 132, 134, 142), pull rods (112, 116, 118, 138) and gears (68, 70) to feed a length of wire and obtain the desired spring configuration.

After the intial setup, the control station 155 and machine controls 157 permit operation of the machine with or without intervention of the drive 16 and controller 18. These conventional controls provide three modes of operation: "Run", "Hand", "Jog".

Upon selecting the "Run" mode, the motor M is actuated by the operator by closing the appropriate button switch (not shown) at the control station 155 and begins to power the belt pulley arrangement 24. The operator then closes a start pushbutton switch (not shown) to energize the valves 22 and 23 to release the brake portion of the clutch brake system 20 and engage clutch portion which in turn drives shaft 26 and gears (28, 40, 44, 46) thereby providing rotary power to the mechanical feed roller actuating mechanism 54 and the wire forming tool actuating mechanism 96. The mechanical feed roller actuating mechanism 54 intermittently feeds a desired length of wire W which is acted upon by the wire forming tooling 14 as the individual tools (98, 100, 102) are selectively and successively moved into and out of their operative positions by the wire forming tool actuating mechanism 96, as has been previously explained. Each spring is severed from the wire W by the cutoff tool 104. The machine 10 will continue to cycle and produce identical springs at the rate of approximately forty-two pieces per minute.

Selection of the "Hand" mode releases the brake portion of the clutch brake system 20 to allow the machine to be handwheeled by the operator by using the handwheel 30 to drive the wire W and tooling 14 through their actuating mechanisms 54 and 96 to produce the basic spring. In selecting the "Jog" mode, the operator can start the motor M by closing the appropriate pushbutton switch (not shown) and operationally engage clutch and release the brake through the start pushbutton switch (not shown) so the machine 10 will feed wire W and operate the tooling 14 in the manner previously described thereby producing the basic springs on continuous basis for as long as the start pushbutton switch is closed.

To produce another type of spring, the standard U.S. Baird machine would normally have to be completely readjusted to provide a new setup for the mechanical feed roller actuating mechanism 54 and the wire forming tool actuating mechanism 96. A skilled operator could perform this task in approximately four hours. However, with a machine embodying the present invention, the basic spring of FIGS. 5A and 5B can be modified quite readily utilizing a "Servo" mode without a new set up for the actuating mechanisms 54 and 96. The "Servo" mode is selected by the operator to be used in combination with the "Hand", "Jog" or "Run" modes so the preprogrammed interruptions and servo driven feed cycles occur therewith.

The controller 18 is preprogrammed in a conventional manner by the operator with up to ten different programs to utilize the signals from the switches 150, 152 and 154 to perform interruptions and feed cycles as the machine 10 cycles through a basic spring production sequence. The programs can be readily recalled by the operator from the memory of the program selector section 18a of the controller 18. To produce the spring 164 illustrated in FIGS. 6A and 6B, which is identical to the basic spring except the body coil thereof has eighteen coils rather than seven coils, the operator selects the desired program through the program selector 18a. The controller 18 is programmed to interrupt the mechanical feed roller actuating mechanism 54 and the wire forming tools actuating mechanism 96 through 18b and 18c as the actuator 146 aligns itself with switch 152 thereby signalling the controller 18 that the tooling 14 is in position to produce the body coil 160. When such a signal is received by the controls 18b and 18c, control 18b in turn signals the electrically operated valves 22, 23 to disengage the clutch portion of the clutch brake system 20 while engaging the brake portion thereof.

The brake portion of the clutch brake system 20 deactivates the actuating mechanisms 54 and 96. Accordingly, the body coiling tool 100 is locked in its operative position adjacent the orifice of the wire guide 86. Concurrently, the control 18c actuates the auxiliary wire feeding drive 16 with a servo speed of three thousand pulses per second to power the upper and lower feed rollers 78 and 84 through the overrunning clutch 74 to feed additional wire against the body coiling tool 100 for the interval of time necessary to form the additional eleven coils in the body of the spring 164. When the final additional coil is formed, the controls 18b and 18c deactivate the auxiliary wire drive 16, release the brake portion of the clutch brake system 20, and engage the clutch portion thereof to reconnect the motor M to the actuating mechanisms 54 and 96. These mechanisms 54 and 96 are powered by the motor M to continue the wire forming operation thereby completing the spring 164. Such a spring can be manufactured at a rate of thirty pieces per minute.

The springs illustrated in FIGS. 7A and 7B through 10A and 10B show the other types of springs that can be manufactured utilizing the auxiliary wire feeding drive 16 of the digital controlled machine 10 of the present invention. The spring 166 of FIGS. 7A and 7B has a body of fifty coils instead of the standard seven coils and is produced in a manner similar to the spring of FIGS. 6A and 6B except the auxiliary drive 16 is run for an interval of time necessary to produce the additional forty-three coils. The spring 168 of FIG. 8A and 8B includes a first loop extension 170 with an increased length of one quarter inch and a body of seventeen coils. Production of this spring 168 requires preprogrammed interruption by the controller 18 of the actuating mechanisms 54 and 96,and actuation of the auxiliary wire feeding drive 16, during the formation of the loop extension 170 and the coil body. These interruptions and actuations are triggered by the actuators 144 and 146 in conjunction with the switches 150 and 152.

Spring 172 of FIGS. 9A and 9B has a thirty-five coil body portion and a tail portion 174. Such a spring requires interruption of the production of the spring and auxiliary wire feeding to be controlled by both of the actuators 146 and 148 and the proximity switches 152 and 154. The tail portion 174 is produced with a servo speed of three hundred pulses per second. A triple interruption produced spring 176 is shown in FIG. 10A and 10B; the first end loop has a loop extension 178 with a nine sixteenths increased length, the body coil has twenty-five coils and the second end loop has a tail 180. The production of the spring 176 is interrupted by the controller 18, as each of the actuators 144, 146 and 148 pass their associated switches 150, 152 and 154, to feed the necessary additional wire to the first loop extension 178, the body coil and the tail portion 180.

It will therefore be seen from the above that our invention provides a spring forming machine which allows a selected amount of wire to be added to a spring in several places during the spring forming process once the machine is initially set up to produce a basic spring.

The preferred embodiment described above admirably achieves the objects of the invention; however, it will be appreciated that departures can be made by those skilled in the art without departing from the spirit and scope of the invention which is limited only by the following claims.

Having thus described the invention, what is claimed is:

1. In an apparatus for progressively forming longitudinally moving wire into springs having body coils and concurrently formed first and second end loops including a fixed wire guide having a rear end and a forward end and a bore therethrough terminating at said forward end in a feed orifice; feed means advancing wire through said bore from said rear to said forward end; a plurality of wire deflecting tools, each of said deflecting tools mounted for operation between a retracted position and an operative position adjacent said forward end of said wire guide; and actuating means for driving said feed means and sequentially operating said plurality of wire deflecting tools between said positions to form a basic spring having a body coil and first and second end loops from the wire advancing from said feed means, the improvement comprises means connected to said actuating means to selectively interrupt said actuating means for prescribed time interval after formation of the first end loop, during formation of the body coil, and before and after formation of said second end loop and auxiliary drive means connected to said feed means for selectively driving said feed means during the prescribed time intervals thereby advancing wire through said bore of said wire guide and adding selected amounts of wire to the basic spring in selected places.

2. The improved wire forming apparatus of claim 1 wherein said interruption means includes an electronic controller for deactivating said actuating means and activating said auxiliary drive means for a prescribed time interval thereby driving said feed means to advance an additional length of wire through said wire guide.

3. The improved wire forming apparatus of claim 2 wherein said electronic controller is programmable to deactivate said actuating means and activate said auxiliary drive means at several points during the sequential operation of said plurality of wire deflecting tools.

4. The inproved wire forming apparatus of claim 2 wherein said actuating means includes a main drive motor operatively connected to said wire deflecting tools and said feed means.

5. The improved wire forming apparatus of claim 4 wherein said interruption means further includes a clutch and brake system controlled by said electronic controller for deactivating said actuating means, said clutch and brake system operatively connecting said main drive motor with said wire deflecting tools and said feed means, whereby said main drive motor is drivingly connected to said tools and said feed means through said clutch when said actuating means is in operation and is disconnected from said tools and feed means when said auxiliary drive means is in operation.

6. The improved wire forming apparatus of claim 5 wherein said clutch and brake system of said interruption means is air operated.

7. The improved wire forming apparatus of claim 6 wherein said interruption means further includes valve means operatively connected between said electronic controller and said clutch and brake system whereby said controller signals said valve means to introduce air to said clutch and brake system and thereby operate the same.

8. The improved wire forming apparatus of claim 2 wherein said actuating means includes mechanical feed actuating means and wire forming tool actuating means.

9. The improved wire forming apparatus of claim 8 wherein said interruption means includes sensor means operatively connect between said controller and said wire forming tool actuating means whereby said sensor means signals said controller at desired intervals during the sequential operation of said plurality of tools.

10. The improved wire forming apparatus of claim 9 wherein said sensor means includes sensor actuators mounted for movement with said wire forming tool actuating means and proximity switches disposed adjacent the paths of movement of said sensor actuators to detect the movement thereof.

11. The improved wire forming apparatus of claim 10 wherein plurality of tools include a first loop forming tool, a coil body forming tool, and a second loop forming tool and a cutoff tool, and wherein said wire forming tool actuating means controls the movement of said tools and includes a series of cam followers which operationally engage rotatably cams driven by a main motor drive to move said tools between their retracted and operative position.

12. The improved wire forming apparatus of claim 11 wherein said sensor actuators and said proximity switches are operationally disposed to signal said controller following retraction of said first loop forming tool, protraction of said coil body forming tool to its advance position, and retraction of said second loop forming tool.

13. The improved wire forming apparatus of claim 9 wherein said controller includes means to receive signals from said sensor means and deactivate said actuating means and activate said auxiliary drive means for a desired interval of time to drive said feed means.

14. The improved wire forming apparatus of claim 13 wherein said auxiliary drive means includes a servo motor with tachometer and encoder feedback.

15. The improved wire forming apparatus of claim 13 wherein said auxiliary drive means is operatively connected to said feed means through an overrunning clutch wherein either said auxiliary drive means or said actuating means can drive said feed means.

16. The improved wire forming apparatus of claim 15 wherein said auxiliary drive means includes a servo motor with tachometer and encoder feedback to said controller.

17. The improved wire forming apparatus of claim 16 wherein said auxiliary drive means further includes a reduction gearbox permitting said auxiliary drive means to be operated at high speed.

18. An accessory for advancing wire in an apparatus for progressively forming longitudinally moving wire into springs having body coils and concurrently formed first and second end loops; said apparatus including a fixed wire guide having a rear end and a forward end and a bore therethrough terminating at said forward end in a feeding orifice, feed means for advancing wire through said bore from said rear to said forward end, a plurality of wire deflecting tools, each of said deflecting tools mounted for operation between a retracted position and an advanced position adjacent said forward end of said wire guide, and actuating means for driving said feed means and sequentially operating said plurality of wire deflecting tools between said positions to form a basic spring having a body coil and first and second end loops from the wire advancing from said feed means; comprising means adapted to be connected to said actuating means to selectively interrupt said actuating means for prescribed time intervals after formation of the first end loop, during formation of the body coil, and before and after formation of said second end loop and auxiliary drive means adapted to be connected to said feed means for selectively driving said feed means during the prescribed time intervals thereby advancing wire through said bore of said wire guide and adding selected amounts of wire to the basic spring in selected places.

19. The accessory for advancing wire in accordance with claim 18 wherein said interruption means includes an electronic controller for deactivating said actuating means and activating said auxiliary drive means for a prescribed time interval thereby driving said feed means to advance an additional length of wire through said wire guide.

20. The accessory for advancing wire in accordance with claim 19 wherein said electronic controller is programmable to deactivate said actuating means and activate said auxiliary drive means at several points during the sequential operation of said plurality of wire deflecting tools.

21. The accessory for advancing wire in accordance with claim 19 wherein said actuating means includes a main drive motor operatively connected to said wire deflecting tools and said feed means.

22. The accessory for advancing wire in accordance with claim 21 wherein said interruption means further includes a clutch and brake system controlled by said electronic controller for deactivating said actuating means, said clutch and brake system operatively connecting said main drive motor with said wire deflecting tools and said feed means, whereby said main drive motor is drivingly connected to said tools and said feed means through said clutch when actuating means is in operation and is disconnected from said tools and feed means when said auxiliary drive means is in operation.

23. The accessory for advancing wire in accordance with claim 22 wherein said clutch and brake system of said interruption means is air operated.

24. The accessory for advancing wire in accordance with claim 23 wherein said interruption means further includes valve means operatively connected between said electronic controller and said clutch and brake system whereby said controller signals said valve means to introduce air to said clutch and brake system and thereby operate the same.

25. The accessory for advancing wire in accordance with claim 19 wherein said actuating means includes mechanical feed actuating means and wire forming tool actuating means.

26. The accessory for advancing wire in accordance with claim 25 wherein said interruption means includes sensor means operatively connected between said controller and said wire forming tool actuating means whereby said sensor means signals said controller at desired intervals during the sequential operation of said plurality of tools.

27. The accessory for advancing wire in accordance with claim 26 wherein said sensor means includes sensor actuators mounted for movement with said wire forming tool actuating means and proximity switches disposed adjacent the paths of movement of said sensor actuators to detect the movement thereof.

28. The accessory for advancing wire in accordance with claim 26 wherein said controller includes means to receive signals from said sensor means and deactivate said actuating means and activate said auxiliary drive means for a desired interval of time to drive said feed means.

29. The accessory for advancing wire in accordance with claim 28 wherein said auxiliary drive means includes a servo motor with tachometer and encoder feedback.

30. The accessory for advancing wire in accordance with claim 28 wherein said auxiliary drive means is operatively connected to said feed means through an overrunning clutch wherein either said auxiliary drive means or said actuating means can drive said feed means.

31. The accessory for advancing wire in accordance with claim 19 wherein said auxiliary drive means includes a servo motor with tachometer and encoder feedback to said controller.

32. The accessory for advancing wire in accordance with claim 31 wherein said auxiliary drive means further includes a reduction gearbox permitting said auxiliary drive means to be operated at high speed.

* * * * *

UNITED STATES PATENT AND TRADEMARK OFFICE
CERTIFICATE OF CORRECTION

PATENT NO. : 4,586,357
DATED : May 6, 1986
INVENTOR(S) : Werner K. Allweier and David W. Knight It is certified that error appears in the above-identified patent and that said Letters Patent are hereby corrected as shown below:

Col. 1, line 28, "directiors" should be --directions--;

Col. 9, line 6, --for-- should be inserted after "means"; and

Col. 9, line 38, "inproved" should be --improved--.

Signed and Sealed this

Twenty-ninth Day of July 1986

[SEAL]

Attest:

DONALD J. QUIGG

Attesting Officer

Commissioner of Patents and Trademarks